United States Patent [19]

Hamano et al.

[11] Patent Number: 4,561,723

[45] Date of Patent: Dec. 31, 1985

[54] ELECTRONIC STEREOSCOPIC VIEWING DEVICE

[75] Inventors: Nobuo Hamano; Kazumi Matsumoto, both of Tokyo, Japan

[73] Assignee: Tomy Kogyo Co., Inc., Tokyo, Japan

[21] Appl. No.: 489,246

[22] Filed: Apr. 27, 1983

[30] Foreign Application Priority Data

Apr. 28, 1982 [JP] Japan .............................. 57-61075[U]

[51] Int. Cl.⁴ .......................... G02F 1/13; G02B 27/22
[52] U.S. Cl. ............................... 350/331 R; 350/133; 350/137; 350/143
[58] Field of Search ................... 350/331 R, 133, 138, 350/137

[56] References Cited

U.S. PATENT DOCUMENTS

| T936,004 | 7/1975 | Willis | 340/784 X |
|---|---|---|---|
| 2,388,170 | 10/1945 | McCollum | 350/133 |
| 3,583,538 | 3/1969 | Hurley | 194/9 |
| 3,697,675 | 10/1972 | Beard et al. | 358/91 |
| 3,737,567 | 6/1973 | Kratomi | 350/331 R X |
| 3,800,452 | 4/1974 | Kiehl | 40/63 A |
| 3,844,650 | 10/1974 | Nicholson et al. | 350/331 R X |
| 4,105,313 | 8/1978 | Altman | 350/331 R X |
| 4,195,915 | 4/1980 | Lichty et al. | 350/345 |
| 4,222,641 | 9/1980 | Stolov | 350/331 R |
| 4,294,524 | 10/1981 | Stolov | 353/122 X |
| 4,365,869 | 12/1982 | Hareng et al. | 350/345 |
| 4,367,923 | 1/1983 | Ishikawa | 350/345 |
| 4,368,963 | 1/1983 | Stolov | 350/331 R X |
| 4,403,216 | 9/1983 | Yokoi | 350/339 F X |

FOREIGN PATENT DOCUMENTS

| 55-118077 | 9/1980 | Japan . | |
|---|---|---|---|
| 0616520 | 1/1949 | United Kingdom . | |
| 0941449 | 11/1963 | United Kingdom . | |
| 1276364 | 6/1972 | United Kingdom . | |
| 1523436 | 8/1978 | United Kingdom | 350/331 R |
| 1540965 | 2/1979 | United Kingdom . | |
| 2113058A | 7/1983 | United Kingdom . | |

OTHER PUBLICATIONS

Teshima et al., "New Color LCDs Open Up New Fields of Application," *JEE* (Nov. 1980) pp. 44-46.

*Primary Examiner*—John K. Corbin
*Assistant Examiner*—Richard F. Gallivan
*Attorney, Agent, or Firm*—K. H. Boswell

[57] ABSTRACT

An electronic stereoscopic viewing device has an electronic signal generator which is coupled electronically to a liquid crystal display screen. The display screen upon receipt of a signal from the signal generator displays first and second views of an image with the first and second images being parallactically displaced with respect to one another. A first optical pathway conducts the first parallactically displaced view to a left eye viewing port and a second optical pathway conducts the second parallactically displaced view to a right eye viewing port. The optical pathways between the display screen and the left and right eye viewing ports are such that the first and second images are conducted to the respective left and right eye viewing ports in a manner maintaining the integrity of each such that the individually parallactically displaced first and second views of the images are received at the respective left and right eye viewing ports without contamination of one by the other.

26 Claims, 6 Drawing Figures

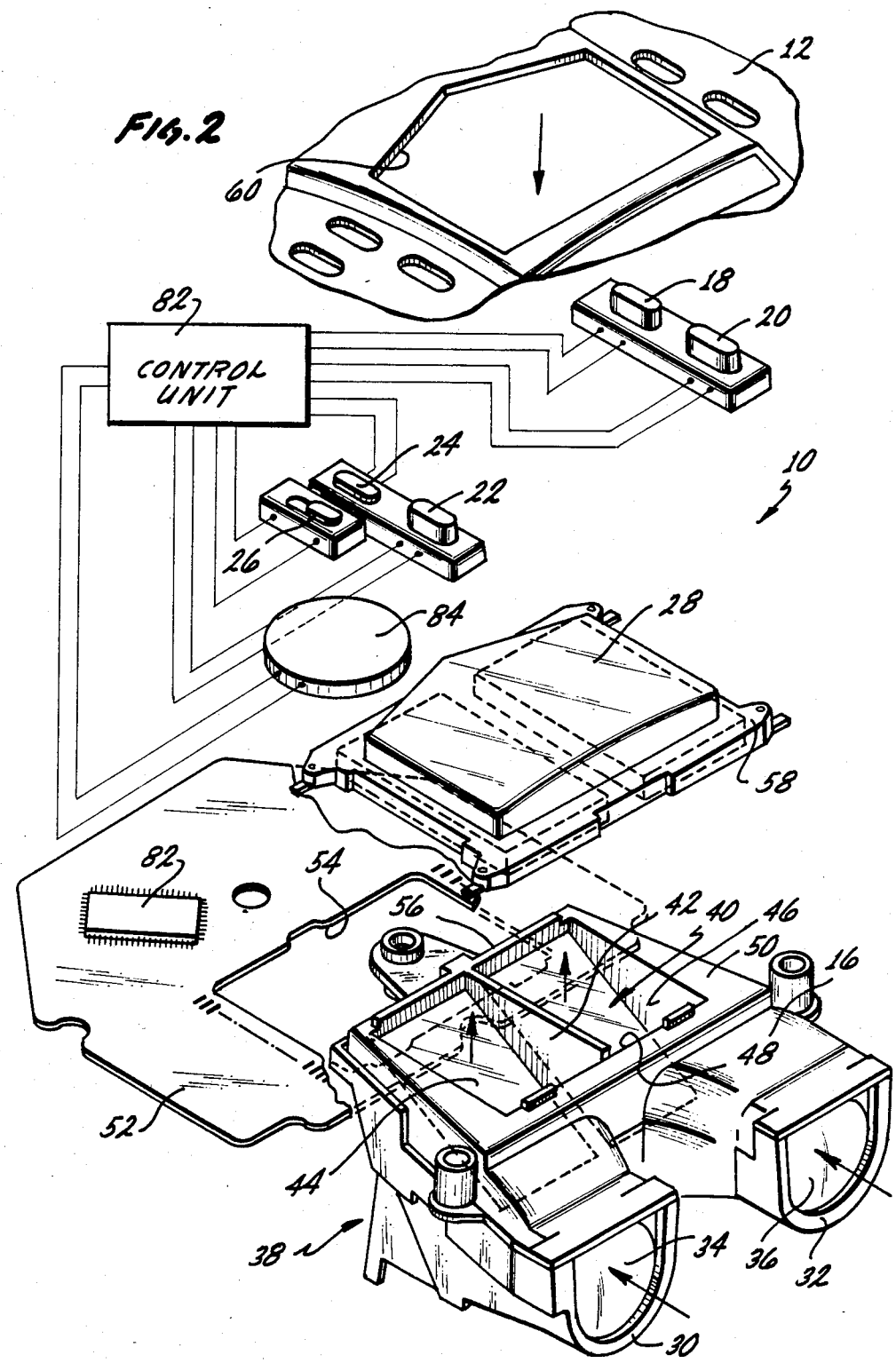

ELECTRONIC STEREOSCOPIC VIEWING DEVICE

BACKGROUND OF THE INVENTION

This invention is directed to an electronic stereoscopic viewing device which utilizes an electronic signal to generate parallactically displaced first and second views of an image. The first and second views of the image are generated on a display device and are conducted to the left and right eye of an observer whereby the observer perceives the image three dimensionally.

The stereoscope was invented in the nineteenth century based on Sir Charles Wheatstone's theory of binocular vision. With the advent of photography, the stereoscope became a popular parlor amusement device in the late eighteen hundreds and early nineteen hundreds. Several decades ago, with the advent of color transparencies, a device marketed under the name VIEWMASTER TM was introduced and remains popular even to this day.

The common stereoscopic viewing devices are based upon independently presenting to the left and right eyes views of scenes which are equivalent to those views as actually seen by the left and right eyes as a human views the scene. Because the left and right eyes of the human are spaced apart a small distance, each eye perceives the scene in a slightly different manner. There is a parallactic shift of the scene as viewed by the left and right eye because of the angle at which each of the eyes view a particular scene.

Additionally, because the left and right eyes are viewing the scene at different angles with respect to the lighting of the scene, there are slight differences in shades and hues perceivable by the separate left and right eyes.

The stereoscope and other like instruments present to the separate left and right eyes individual views which differ with regard to the parallactic displacement of the views presented for the object in the scene which is displayed. The photographs or transparencies utilized by these devices can be produced by taking a first photograph at one position and then shifting the camera a distance corresponding to the distance between the left and right eye and taking a second photograph. This method has disadvantages because of the time period involved in moving the camera and the actual physical movement of the camera between the taking of the two photographs. To overcome these disadvantages, a single camera having two lenses or a single camera having a single lens and a system of mirrors which directs two light beams through the single lens can be used to simultaneously produce left and right images on a strip of film.

The above described systems result in photographs or transparencies which are static in nature, and while they have a three dimensional effect, they do not convey any motion within the scenes depicted.

With the invention of practical polarizing material during the last half century, it has become possible to develop three dimensional motion pictures. For the three dimensional motion picture, separate left eye and right eye views are directed to the observer from a screen with each of these views being carried by light which is polarized along axes which are rotated differently from each other. The viewer utilizes a set of glasses having polarizing filters with the filter for one eye aligned with the axes of polarization of one of the views and the filter of the other eye aligned with the axis of polarization of the other view. The filters in front of the eyes allow transmission of only that light which is polarized with respect to the axis of the filter of the particular eye and blocks the light which is polarized with respect to the axis of the filter of the other eye. As such, each eye only receives one of the polarized views. Upon receipt of separate left and right eye views through the filtered glasses, the separate views are transmitted by the eyes to the brain for reconstruction of a three dimensional image by the brain.

The stereoscope, VIEWMASTER TM and three dimensional motion pictures all require, however, that an existing scene be present or be physically recreated such that the same can be photographed in order to represent the same scene in a three dimensional manner to an observer. These devices thus are limited to reproducing actual scenes, or if directed toward animated scenes, each individual frame of the animated scene must be set up and photographed.

With the miniaturization of electronics in the last two decades, the video arcade game and smaller hand held versions of the same have become possible. The current popularity of these devices is phenomenal. It is presently possible to hook up certain of these devices to home TV sets for display of the games generated by the device on the television set for home use. The currently known arcade and/or video devices, however, are two dimensional and while the amusement and interest associated with the same is exceedingly high, they lack a feeling of being visually a part of the game because their visual projection systems do not correspond to the reality of actual vision or to the three dimensional effects available in the stereoscopic or other three dimensional viewing devices.

Stereoscopic and other three dimensional devices lack the skill and interest which is achieved in the game type video arcade electronic devices and in turn the game type video arcade electronic devices lack the reality of stereoscopic perception available with the stereoscope and other 3D type devices. In order to integrate these seemingly two mutually exclusive aspects, i.e., the game playing ability of the electronic devices and the three dimensional imagery of the stereoscopic devices, it has been suggested to project at a frequency higher than that discernible by the human, alternate parallactic left and right images displayed in associated with the electronic game. This requires the production of strobe-like pulses of these images at a frequency greater than that which can be recognized by the human brain. However, since both the left and right eye of the human observer are viewing both of the parallactically displaced images, the stereoscopic effect achievable by this method is not the same as when the left and right eye actually receive individual parallactic left and right images which are isolated from each other. Furthermore, the relaxation time of the display screen on which these images are generated must be sufficiently short such that the images depicting the right parallax are time differentiated from those depicting the left parallax image.

BRIEF DESCRIPTION OF THE INVENTION

In view of the above, it is a broad object of this invention to provide a stereoscopic device capable of displaying right and left parallactically displaced views of an image wherein these image views are produced electronically. It is a further object of this invention to provide such a device wherein the electronic producton of the images results in production of images which are capable of depicting movement of the image. It is a further object of this invention to provide a game device wherein the display of the game produces images which are three dimensional in nature. Further, it is an object of this invention to produce such a device in an economical manner such that it is readily available to the consuming public.

These and other objects, as will become evident from the remainder of this specification, are achieved in a stereoscopic viewing device which comprises: an electronic signal generating means, said signal generating means producing an electronic signal; an electronically driven image display means, said display means electronically connected to said signal generating means so as to electronicially receive said electronic signal from said generating means and in response to receipt of said electronic signal from said generating means said display means visibly displaying parallactically displaced first and second views of an image; a first and second non-polarizing visible image conducting means each optically connected to said display means so as said first image conducting means optically receives said first view of said image and said second image conducting means optically receives said second view of said image; said first image conducting means including a left eye viewing port, said second image conducting means including a right eye viewing port; said first image conducting means optically conducting said first view of said image to said left eye viewing port for visual perception of said first view of said image by the left eye of an observer, said second image conducting means optically conducting said second view of said image to said right eye viewing port for visual perception of said second view of said image by the right eye of said observer, said first and said second image conducting means optically insulated with respect to one another so as to restrict optical transfer of said first and said second views of said image between said first optical conducting means and said second optical conducting means.

Preferredly, the display means is divided into a first and second section with the first view of the image displayed at the first section and the second view of the image being displayed at the second section. As such, the first image conducting means is preferredly positioned with respect to the first section of the display means such that the first image conducting means receives the first view of the image from the first section with the second conducting means positioned with respect to the second section so as to receive the second view of the image from the second section.

In the preferred embodiment of the invention, the first and second views of the image would be preferredly formed of a composite of elements with the elements arranged to form patterns. Those elements associated with the first section would form a first pattern and the elements associated with the second section would form a second pattern, with the first and second patterns geometrically related to each other with at least a portion of these patterns being parallactically displaced with respect to one another. Preferredly, the electronic signal would be a modulated signal and upon receipt of that modulated signal the display means would sequentially display the individual elements of the patterns so as to convey motion from one location on the display means to a different location on the display means. Preferredly, the display of the individual elements would be a transitory display so that as the elements are sequentially displayed, they are displayed momentarily and then the display is erased such that a further feeling of motion is conveyed.

In the preferred embodiment, the display means would comprise a liquid crystal display with the liquid crystal display capable of being illuminated by visible light and the images formed by light transmitted through the liquid crystal display. The first and second image conducting means would be located in association with the liquid crystal display so as to receive the first and second images formed by the light transmitted through the liquid crystal display and then convey this light to the left and right eye viewing ports. A color transparency sheet can be associated with the liquid crystal display such that light transmitted by the liquid crystal display is colored by the colors on the sheet. Preferredly, the sheet would have colors located thereon in patterns mimicking the patterns on the liqud crystal display such that these patterns are colored by light transmitted to the colored sheet.

BRIEF DESCRIPTION OF THE DRAWINGS

The invention described in this specification will be better understood when taken in conjunction with the drawings wherein:

FIG. 2 is an exploded isometric view, partially shown diagrammatically, illustrating certain of the components seen in FIG. 1;

Figure 1:
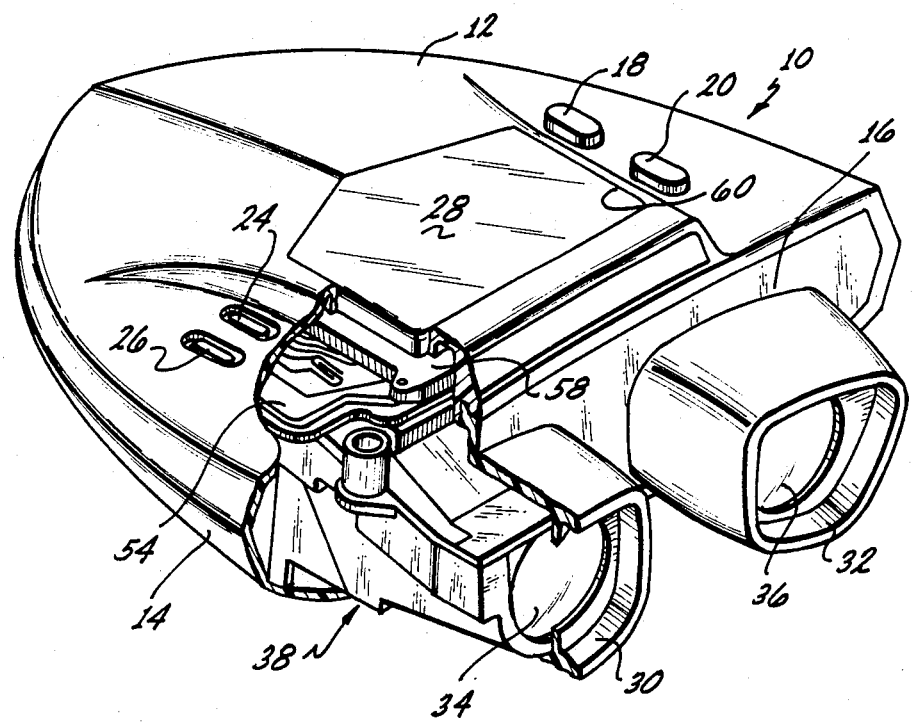
FIG. 1 is an isometric view of an illustrative embodiment of this invention.

The invention described in this specification and illustrated in the drawings utilizes certain principles and/or concepts as are claimed in the claims appended to this specification. Those skilled in the arts to which this invention pertains will realize that these principles and/or concepts are capable of being utilized in a variety of embodiments differing from the exact embodiment utilized for illustrative purposes herein. For this reason, this invention is to be construed only in light of the claims and is not to be construed as being limited to the exact illustrative embodiment.

DETAILED DESCRIPTION OF THE INVENTION

In the figures, a game apparatus 10 is shown as illustrative of the invention. The apparatus 10 is a small hand held device which is self contained and portable. The game apparatus 10 includes an upperhousing 12, a lower housing 14 and an eyepiece housing 16. Not seen in the figures would be a small battery access port in the lower housing 14 allowing for the insertion of common dry cells into the game apparatus 10 to power the same.

Exposed out of the upper housing 12 are several operational buttons. These include fire button 18, right shift button 20, left shift button 22, off/on button 24 and sound system off/on button 26. Centrally located in the upper housing 12 is a translucent screen 28 which serves to emit light into the interior of the game apparatus 10 as hereinafter explained.

The eyepiece housing 16 is shaped for binocular type use of the game apparatus 10. The housing 16 includes a left eye viewing port 30 and a right eye viewing port 32. Located inside the left eye viewing port 30 is a left eye lens 34 and located within the right eye viewing port 32 is a right eye lens 36. These components complete those components which are viewable from the outside of the game apparatus 10.

An interior housing 38 is located within the interior of the apparatus 10. The left and right eye lenses 34 and 36 are mounted to the interior housing 38 with the interior housing 38 mating with the outside upper and lower housing members 12 and 14 to correctly position the lenses 36 and 38 in the viewing ports 30 and 32 of the eyepiece housing 16. Also mounted within the interior housing 38 is a mirror 40.

A baffle 42 projects downwardly against the surface of the mirror 40, dividing the mirror 40 into two sections, each of which is optically isolated from the other. This creates a first optical pathway which passes from side 44 of the mirror 40 toward and through the left eye lens 34 and a second optical pathway which passes from side 46 of the mirror 40 toward and through right eye lens 36. Because of the presence of the baffle 42 and the tube or binocular shape of the interior housing 38 around those portions which contact and support the lenses 34 and 36, the two optical pathways are totally optically isolated or optically insulated from one another, preventing optical contamination between the two pathways. Thus, any image picked up and reflected from side 44 of the mirror 40 towards the left lens 34 is prevented by the baffle 42 from also being viewed through the right lens 36 and vice versa.

A rectangular opening 48 is formed in a wall 50 of the interior housing 38. The wall 50 abuts against the insulated side of a circuit board 52. The circuit board 52 in turn also has a rectangular opening 54 located therein. When the circuit board 52 is overlayed on top of the interior housing 38, the rectangular opening 38 in the wall 50 mates with the rectangular opening 54 in the circuit board 52 to form an optical passageway through the circuit board 52. The baffle 42, as well as a small web 56 which is perpendicular to the baffle 42 and formed as a part of the wall 50, project upward through the opening 54 in the circuit board 52 to maintain the integrity and the optical independence of the two optical pathways mentioned above.

The translucent screen 28 previously mentioned is formed as a bubble on holding member 58. The screen portion 28 of the holding member 58 fits into a window 60 formed in the upper housing 12 with the screen 28 then fitting flush with the outside surface of the upper housing 12.

Figure 3:
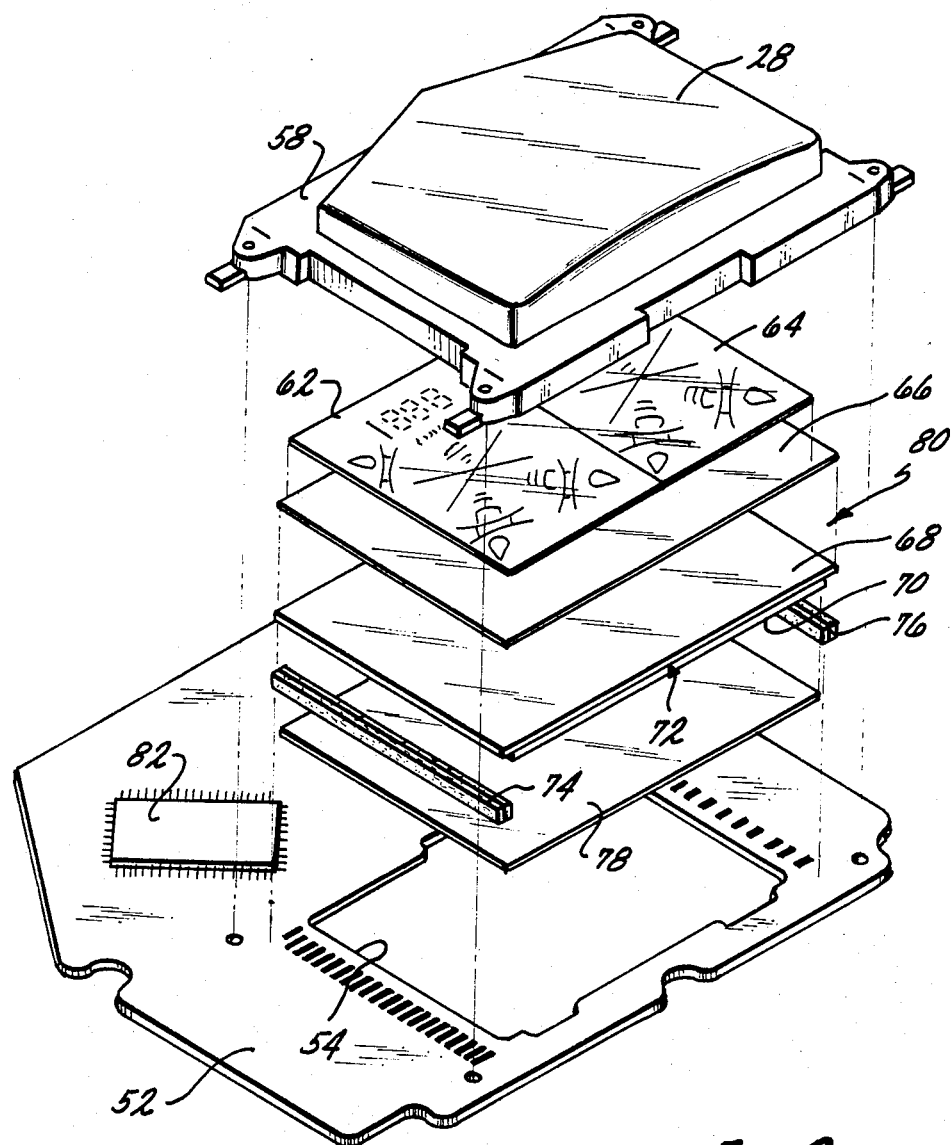
FIG. 3 is a isometric view further exploding one of the components seen in FIG. 2.

As is evident from viewing FIG. 3, there are several components which fit inside of the holding member 58. The uppermost of these components are left and right color transparencies 62 and 64 which fit directly beneath the translucent screen 28 when the components of FIG. 3 are assembled within the holding member 58. Directly below the transparencies 62 and 64 is a first sheet of polaroid 66. Directly beneath the first sheet of polaroid 66 are upper 68 and lower 70 glass plates which together with a liquid crystal material 72, which is sealed between the two glass plates 68 and 70, form a liquid crystal display 80. Fitting against the underneath side of each of the side edges of the upper glass plate 68 are contact strips 74 and 76, respectively, and positioned between the two contact strips 74 and 76 is a second or lower polaroid sheet 78.

All of the components 62, 64, 66, 70, 72 and 78 form a neat stack, one upon the other, each of these components being located next to the components directly above or below them. The totality of these components fit inside of the holding member 58 when the apparatus 10 is assembled. As assembled, the lower, or second, polaroid sheet 72 fits directly over the rectangular opening 54 in the circuit board 52 with the edges of the baffle 42 and the web 56 positioned against the lower polaroid sheet 78. As hereinafter explained, light is transmitted through the window 60 through the color transparencies 62 and 64, through the first polaroid sheet 68, and, under certain conditions, through the glass plates 68 and 70 and the liquid crystal material 72 located between them, and finally through the second polaroid sheet 78 to be further optically conducted through the two optical pathways previously described toward the lenses 34 and 36 for presentation to the left and right eyes of a user of the game apparatus 10.

The translucent screen 28, as well as the remainder of the holding member 58, are made of a translucent resin which is capable of evenly diffusing light toward the color transparencies 62 and 64 when the translucent screen 28 is exposed to ambient light. The diffusion of the light by the translucent screen 28 results in a more even distribution of the light at a uniformly diffused intensity toward the color transparency 64 and the liquid crystal display 80.

In the illustrative game apparatus 10, the liquid crystal display 80 is controlled by a microcomputer 82 which drives the liquid crystal display 80. As hereinafter explained, the liquid crystal display 80 is divided into two sections which have geometrically similar patterns located thereon, with certain components of the patterns being parallactically shifted with respect to one another. The control of the liquid crystal display 80, however, by the microcomputer 82 is analagous to control of other liquid crystal displays by other microcomputers such as currently found in other electronic games, electronic watches and other display units wherein microcomputers are utilized to control the movement of design elements on a liquid crystal display.

The off/on button 24 controls the activation of the microcomputer 82 to drive the liquid crystal display 80. The left and right shift buttons 20 and 22 are utilized as operator controls to input commands to the microcomputer 82 to cause certain images on the liquid crystal display 80 to shift to the right or left, as is standard in other electronic games. The fire button 18 activates further commands in the microcomputer 82 to initiate a display of patterns resembling missiles, projectiles or the like, as is also found in other electronic games. Together, the fire button 18 and the left and right shift buttons 20 and 22 form observer interface means between the observer utilizing the game apparatus 10 and the microcomputer 82 to translate the actions of the observer to the microcomputer 82.

A piezoelectric sound emitter 84 is further connected to the microcomputer 82 to emit game sounds associated with images displayed on the liquid crystal display 80, as is also found in other electronic game systems. The sound system off/on button 26 allows for the incorporation of the sound emitter 84 into the game or shutting off of the same for silent play of the game without disturbing others located in the immediate environment of the user of the game apparatus 10.

As is shown in FIG. 2, the microcomputer 82 is appropriately located in the circuit board 52 such that it can be electrically connected to the liquid crystal display 80 via the contact strips 74 and 76 which make electrical contact between the liquid crystal display 80 and the circuit board 52 in a conventional manner.

The liquid crystal display 80 utilizes two polaroid sheets, sheets 66 and 78 in conjunction with the liquid crystal material 72 located between the glass plates 68 and 70 to display the images on the liquid crystal display 80. The inside surfaces of the glass plates 68 and 70 have electrodes fused thereon in the conventional manner for producing liquid crystal displays. The fused electrodes are in the shapes of the images which will be created by the liquid crystal display 80 when it is electronically activated. In conjunction with the liquid crystal material 72, the axis of polarization of the polaroid sheets 68 and 70 can be oriented with respect to one another to produce the preferred "light" image wherein the light transmitted through sheet 78 carries the images, or alternately the image can be a "dark" image, against light background with the light background formed by light transmitted through sheet 78.

In the illustrative embodiment, the polaroid sheets 66 and 78 are oriented with respect to one another to produce the preferred image such that when an electronic signal is applied across the liquid crystal material 72, the image portions of the liquid cyrstal display 80 becomes transparent to the transmission of light and light passes through it. Once light has passed through the liquid crystal display 80 the left and right views of images are created in the transmitted light. The light in the form of the created views of the images is then transmitted through the left and right optical pathways and is only acted upon by reflection by the mirror 40 and refraction by the lenses 34 and 36. Once polarization of the light has taken place to produce the images in the liquid crystal display 80, after passing through sheet 78, no further polarization of this light is effected. Thus, in the optical pathways between the liquid crystal display 80 and the lenses 34 and 36, no further polarization of this light is effected. Thus, in the optical pathways between the liquid crystal display 80 and the lenses 34 and 36 light forming the images is only optically refracted or reflected.

The lenses 34 and 36 are convex lenses which are utilized to enlarge the images impinged thereon to increase the scale of the image created on the liquid crystal display 80. The mirror 40 is utilized to bend the directions of the images within the left and right optical pathways in order to allow horizontal orientation of the game apparatus 10 with the translucent screen 28 being pointed in a generally upward direction. Since most ambient light, either ambient sunlight or artificial light, would be from an upward source, the use of the mirror 40 allows for convenient harvesting of this light by the horizontally oriented translucent screen 28 and display of the images at the left and right lenses 34 and 36 allowing for a normal horizontal axis orientation of the eye of the observer utilizing the game apparatus 10. It is of course realized that minor optical modifications could be effected to allow for other orientations by using further reflectizing surfaces and/or refracting elements as would be standard in the optical arts.

The left and right viewing ports 30 and 32 are spaced apart from one another at a convenient distance allowing for comfortable binocular utilization of the game apparatus 10. The lenses 32 and 34 are conveniently set a short distance within the viewing ports 30 and 32 allowing for placement of the viewing ports 30 and 32 in close proximity to the face of the user to inhibit the introduction of stray ambient light into the image field presented on the left and right lenses 34 and 36. The binocular type arrangement of the viewing ports 30 and 32 as well as the convenient location of the shift buttons 20 and 22 and the fire button 18 on the top of the game apparatus 10 allows for convenient binocular type hand holding of the game apparatus 10 during play of the same.

Figure 4A:
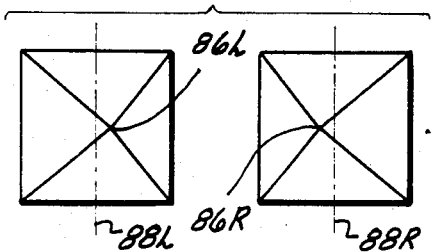
FIGS. 4a and 4b are diagrammatic views illustrating parallactically displaced views of images.
Figure 4B:
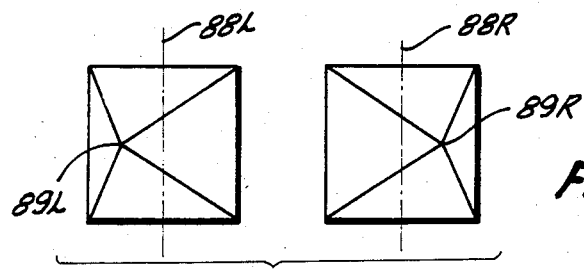

Referring now to FIGS. 4a and 4b, diagrammatic type representations of parallactically displaced views of an image are shown. As can be seen in FIG. 4a, the apex 86L of the crosshairs in FIG. 4a is located to the right of the center line 88L in the left hand figure and the apex 86R is located to the left of the center line 88R in the right hand figure. The center lines 88 are shown in phantom to indicate that they represent the vertical geometric center line of the left and right presentations in FIG. 4a. When an image such as that seen in FIG. 4a is viewed through the game apparatus 10, the cross hairs would appear as a pyramid shaped object with the viewer looking down from the top of the object. A three dimensional effect would be acheived because of the parallactic displacement between the left and right presentation as seen in FIG. 4a.

If the image of FIG. 4a is then displaced to FIG. 4b such that the apexes 90 of FIG. 4b are shifted with respect to the center lines 88, a feeling of motion will be conveyed to the observer in conjunction with the three dimensional effect acheived because of the parallactic displacement also evident in the left and right images in FIG. 4b.

Figure 5:
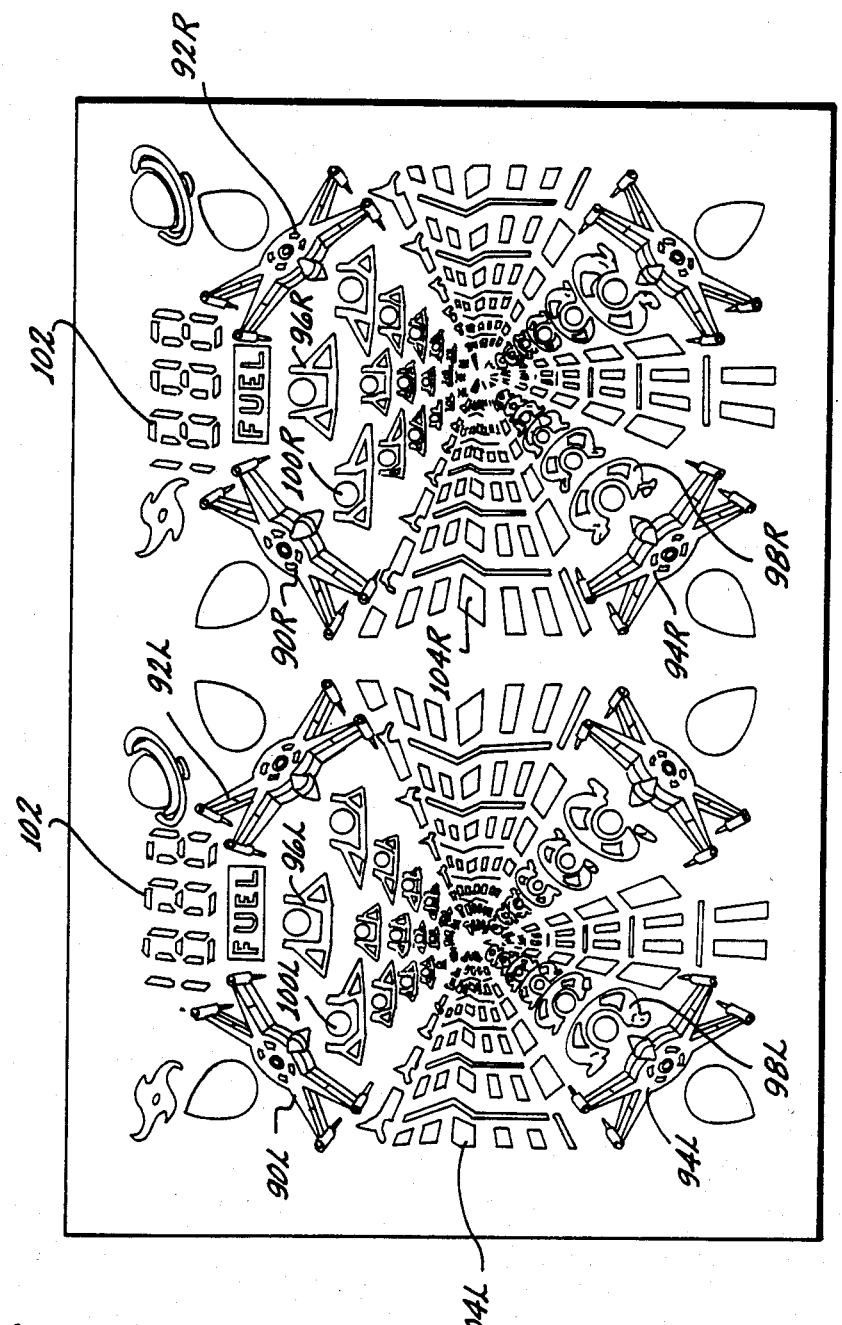
FIG. 5 is a plan view diagrammatically showing image elements located on one of the components of FIG. 3.

In FIG. 5, a typical representation of patterns which would be incorporated into the liquid crystal display 80 for the game apparatus 10 is shown. In FIG. 5 the image which would be seen by the observer of the game apparatus 10 wherein the patterns of FIG. 5 are utilized would depend upon which of the individual patterns is currently being displaced in response to the electronic signal displayed by the liquid crystal display 80. It can be seen in viewing the left and right sides of FIG. 5 that individual elements are combined together to produce certain patterns which, when illuminated, would produce the images displayed by the liquid crystal display 80. Thus, for instance, left and right parallactically displaced views 90L and 90R of a space ship element 90 are shown. Other elements are also repeated between the left and right hand sides of FIG. 5 in a similar parallactically displaced manner. When the individual left and right views of the spaceship element 90 are illuminated, each of the individual views will be conveyed by its respective optical pathway to one of the left and right eyes of the observer viewing the same and together the two parallactically displaced views 90L and 90R will produce a three dimensional image of the spaceship element 90.

During use of the game apparatus 10, the liquid crystal display 80 will shift the position of the spaceship element 90 from the positions 90R and 90L to the positions 92 and 94 by depressing an appropriate shift button 20 or 22. For the case of the shift from the image 90 to the image 92 depression of the right shift button 20 would shift the image from the position 90 to the position 92. To shift in the opposite direction to image 94, left shift button 18 would be pushed. In response to the control buttons 18, 20 and 22, as well as in response to the internal signal of the microcomputer 82, the microcomputer 82, a digital logic device, outputs a modulated signal to the liquid crystal display 80 to cause the display of the variety of patterns thereon during play of the game apparatus 10.

While for the purposes of the illustrative embodiment of this invention images are created by a microcomputer 82 in conjunction with a liquid crystal display 80, other electronics or electrical systems could be utilized in place thereof. Thus, in a very basic system, images such as that depicted in FIG. 4 could be created with simple gas discharge tubes controlled by standard electrical appliances as has been known in the electrical arts for many years. The requirement for the display utilized for the game apparatus 10 is that the display must be capable of producing first and second views of images which are parallactically displaced from one another to create the three dimensional effect of these images. It is, of course, realized that certain elements of the particular patterns which make up these images would not be subject to parallactic displacement such as those elements which might depict horizon lines or other visual elements which do not change due to perspective.

As can be seen in FIG. 5, the images created by the liquid crystal display 80 are left and right geometrically related views of images with parallactic displacement between the left and right side. These images would be created in the standard manner in construction of liquid crystal display devices by construction of the appropriate electronic conducting patterns on the glass plates 68 and 70. In order to color these images for perception of colored images at the view ports 30 and 32, the color transparencies 62 and 64 are used.

The color transparencies 62 and 64 would repeat the patterns formed on the liquid crystal display 80 with different elements of these patterns colored different colors in order to render the images visible at the view ports 30 and 32 multi-colored. For this it is preferable to use simple plastic transparent sheets bearing colors thereon with the colors arranged in patterns mimicking the patterns of the liquid crystal display and overlaying the color transparencies 62 and 64 on the liquid crystal display 80 such that the patterns on the transparencies 62 and 64 are aligned with the patterns on the liquid crystal display 80. As with the patterns on the liquid crystal display 80, the patterns on the transparencies 62 and 64 would be geometrically related; however, they would be parallactically displaced.

In the illustrative embodiment of the game apparatus 10, the transparent sheets 62 and 64 are placed against the transparent screen 28 of the liquid crystal display. This then colors the light transmitted through the transparent screen 28 prior to polarization of that light by the first polarizing sheet 66. Preferredly, the transparent sheets 62 and 64 are of a thickness in order to sufficiently color the light being impinged upon the liquid crystal display 80 without severely reducing its intensity.

Typical play of the game apparatus 10 as shown in the illustrative embodiment utilizing images such as that seen in FIG. 5 would be as follows. Flying enemy objects, such as objects element 96 and 98 would appear near the center of the left and right section of FIG. 5 flying outward toward the operator controlled spaceship elements 90 or its other counterparts 92, 94 or the unlabelled one at the lower right hand corner of the sections. Upon depression of the fire button 18, the spaceship element 90 attempts to fire attack object element 100 towards and strike the enemy object element 96 and 98. If one of the enemy object elements 96 or 98 strikes the spaceship element 90, the spaceship element 90 would be destroyed. However, if one of the attack object elements 100 strikes the enemy object elements 96 or 98, the enemy object element would be displaced in a manner analagous to two dimensional electronic games. A tally of operator's performance would be indicated by the indicia 102 also seen on the liquid crystal display 80.

In play of the game, the spaceship element 90, the enemy object elements 96 and 98, or the attack object element 100 simply move on the two dimensional surfaces of the liquid crystal display 80. However, to the player of the same viewing the same from the view ports 30 and 32, the movement of all of these members appears to be not only right and left and up and down but also towards and away from the player in a three dimensional manner due to the splitting of the liquid crystal display 80 into the left and right sections with the parallactically displaced patterns on these two sections. Further, it is noted in FIG. 5 that as the objects move toward or away from the center of the particular sections they diminish or enlarge in size. By sequentially activating or lighting these particular patterns as they move toward or away from the center, a feeling of movement is achieved. With the use of the liquid crystal display 80 the illumination of any particular pattern on the liquid crystal display would be transitory in nature such that a sequential array of these transitory patterns would be illuminated to cause certain of the objects such as the enemy object elements 96 and 98 to move outwardly away from the centers of the sections of the liquid crystal display 80 toward the spaceship elements 90 or for the attack objects 100 from the periphery of the particular sections of the liquid crystal display 80 toward the center.

Other patterns, such as the patterns 104 would be utilized to produce effects such that if one of the attack object elements 100 successfully coincided with one of the enemy objects such as enemy object element 96, the object element 96 would appear to blow up with the illumination of the pattern elements 102 which represents pieces of the other elements also as per two dimensional electronic games.

We claim:
1. A stereoscopic viewing device which comprises:
an electronic signal generating means, said signal generating means producing an electronic signal;
an electronically driven liquid crystal display, said liquid crystal display electronically connected to said signal generating means so as to electronically receive said electronic signal from said generating means and in response to receipt of said electronic signal from said generating means said liquid crystal display visibly displaying parallactically displaced first and second views of an image;
an exposure means for exposing said liquid crystal display to visible light such that said liquid crystal display is illuminated by said visible light and said images are formed by said light transmitted through said liquid crystal display;
a first and a second non-polarizing visible image conducting means each optically connected to said display means so as said first image conducting means optically receives said first view of said image and second image conducting means optically receives said second view of said image;

said first image conducting means including a left eye viewing port, said second image conducting means including a right eye viewing port;

said first image conducting means optically conducting said first view of said image to said left eye viewing port for visual perception of said first view of said image by the left eye of an observer, said second image conducting means optically conducting said second view of said image to said right eye viewing port for visual perception of said second view of said image by the right eye of said observer, said first and said second image conducting means optically insulated with respect to one another so as to restrict optical transfer to said first and said second views of said image between said first optical conducting means and said second optical conducting means.

2. The viewing device of claim 1 wherein:
said liquid crystal display is divided into a first section and a second section, said first view of said image being displayed at said first section and said second view of said image being displayed at said second section.

3. The viewing device of claim 2 wherein:
said first image conducting means is positioned with respect to said liquid crystal display such that said first image conducting means is associated with said first section of said liquid crystal display so as to receive said first view of said image from said first section;
said second image conducting means is positioned with respect to said liquid crystal display such that said second image conducting means is associated with said second section of said liquid crystal display so as to receive said second view of said image from said second section.

4. The viewing device of claim 3 wherein:
said first image conducting means includes a first optical pathway and a first input port, said first optical pathway positioned between said first input port and said left eye viewing port;
said second image conducting means includes a second optical pathway and a second input port, said second optical pathway positioned between said second input port and said right eye viewing port.

5. The viewing device of claim 4 including:
an opaque baffle means positioned between said first and second optical pathways, said baffle means preventing said optical transfer of said first and said second views between said first and said second optical pathways.

6. The viewing device of claim 5 including:
at least one optical direction changing means located in said first optical pathway and at least one optical direction changing means located in said second optical pathway, said direction changing means in said first and said second optical pathways changing the direction of conduction of said views within said first and said second image conducting means.

7. The viewing device of claim 6 wherein:
said direction changing means includes at least one reflection surface.

8. The viewing device of claim 7 wherein:
said left and right eye viewing ports are spaced apart with respect to one another allowing for binocular use of said device by said observer.

9. The viewing device of claim 8 further including:
a refractor lens located at each of said left eye and right eye viewing ports.

10. The viewing device of claim 1 wherein:
said first view of said image is composed of a plurality of first view elements, said second view of said image is composed of a plurality of second view elements, said plurality of first view elements arranged in first view patterns, said plurality of second view elements arranged in second view patterns, said first view and said second view patterns geometrically related to each other with at least a portion of said first view and said second view patterns parallactically displaced with respect to each other.

11. The viewing device of claim 1 wherein:
said electronic signal is a modulated signal.

12. The viewing device of claim 11 wherein:
said electronic signal generating means is a digital logic device.

13. The viewing device of claim 10 wherein:
said electronic signal is a modulated signal;
said liquid crystal display upon receipt of said modulated signal sequentially displaying individual elements of said first view and said second view patterns so as to convey motion from one location on said liquid crystal display to a second location on said liquid crystal display.

14. The viewing device of claim 13 wherein:
said display of said individual view elements of said first and said second view pattern elements is a transitory display of said individual view elements.

15. A stereoscopic viewing device which comprises:
an electronic signal generating means, said signal generating means producing an electronic signal;
an electronically driven liquid crystal display, said liquid crystal display electronically connected to said signal generating means so as to electronically receive said electronic signal from said generating means and in response to receipt of said electronic signal from said generating means said liquid crystal display visibly displaying parallactically displaced first and second views of an image;
an exposure means for exposing said liquid crystal display to visible light such that said liquid crystal display is illuminated by said visible light and said images are formed by said light transmitted through said liquid crystal display;
a first and a second non-polarizing visible image conducting means each optically connected to said display means so as said first image conducting means optically receives said first view of said image and second image conducting means optically receives said second view of said image;

said first image conducting means including a left eye viewing port, said second image conducting means including a right eye viewing port;

said first image conducting means optically conducting said first view of said image to said left eye viewing port for visual perception of said first view of said image by the left eye of an observer, said second image conducting means optically conducting said second view of said image to said right eye viewing port for visual perception of said second view of said image by the right eye of said observer, said first and said second image conducting means optically insulated with respect to one another so as to restrict optical transfer of said first and said second views of said image between said first optical conducting means and said second optical conducting means;

said first and said second image conducting means are located in association with said liquid crystal display with said liquid crystal display being located between said exposure means and said first and said second image conducting means such that said first and said second image conducting means receive said light transmitted by said liquid crystal display;

a colored transparency sheet positioned in association with said liquid crystal display such that light transmitted by said liquid crystal display is colored by said transparency sheet.

16. The viewing device of claim 15 wherein:

said colored transparency sheet is positioned between said liquid crystal display and said exposure means, said first view of said image is composed of a plurality of first view elements, said second view of said image is composed of a plurality of second view elements, said plurality of first view elements arranged in first view patterns, said plurality of second view elements arranged in second view patterns, said first view and said second view patterns geometrically related to each other with at least a portion of said first view and said second view patterns parallactically displaced with respect to each other;

said colored transparency sheet includes a plurality of colored pattens mimicking said first and said second view patterns, said transparency sheet aligned with respect to said liquid crystal display such that said colored patterns are aligned with the corresponding first and second view patterns which they mimick.

17. The viewing device of claim 16 wherein:

an opaque wall, said liquid crystal display located in association with said wall, said wall including a window, said window at least partially translucent to visible light, said liquid crystal display located with respect to said window so as to receive light from said window;

said colored transparency sheet positioned between said liquid crystal display and said window, said liquid crystal display includes a first and second layer of a polaroid material and a layer of a liquid crystal material, said layer of liquid crystal material located between said first and second polaroid material layers, said first polaroid material layer oriented towards said window and serving as a polarizer, said second polaroid layer oriented toward said first and said second image conducting means and serving as an analyzer.

18. The viewing device of claim 17 wherein:

said window includes a light diffusion means, said light diffusion means interspaced between a source of ambient light and said colored transparency sheet, said light diffusion means comprises a translucent element capable of uniformly diffusing said ambient light towards said sheet.

19. The viewing device of claim 15 wherein:

said colored transparency sheet is positioned between said liquid crystal display and said exposure means.

20. The viewing device of claim 15 including:

an opaque wall, said liquid crystal display located in association with said wall, said wall including a window, said window at least partially translucent to visible light, said liquid crystal display located with respect to said window so as to receive light from said window;

said colored transparency sheet positioned between said liquid crystal display and said window.

21. The viewing device of claim 15 wherein:

said first view of said image is composed of a plurality of first view elements, said second view of said image is composed of a plurality of second view elements, said plurality of first view elements arranged in first view patterns, said plurality of second view elements arranged in second view patterns, said first view and said second view patterns geometrically related to each other with at least a portion of said first view and said second view patterns parallactically displaced with respect to each other, said colored transparency sheet includes a plurality of colored patterns mimicking said first and said second view patterns, said transparency sheet aligned with respect to said liquid crystal display such that said colored patterns are aligned with the corresponding first and second view patterns which they mimick.

22. The viewing device of claim 15 wherein:

said liquid crystal display includes a first and second layer of a polaroid material and a layer of a liquid crystal material, said layer of liquid crystal material located between said first and second polaroid material layers, said first polaroid material layer oriented towards said window and serving as a polarizer, said second polaroid layer oriented toward said first and said second image conducting means and serving as an analyzer.

23. The viewing device of claim 22 wherein:

said window includes a light diffusion means, said light diffusion means interspaced between a source of ambient light and said colored transparent sheet.

24. The viewing device of claim 23 wherein:

said light diffusion means comprises a translucent element capable of uniformly diffusing said ambient light towards said sheet.

25. The viewing device of claim 15 wherein:

said window includes a light diffusion means, said light diffusion means interspaced between a source of ambient light and said colored transparency sheet;

said light diffusion means comprises a translucent element capable of uniformly diffusing said ambient light towards said sheet.

26. The viewing device of claim 25 wherein:

said first image conducting means includes a first optical pathway and a first input port, said first optical pathway positioned between said first input port and said left eye viewing port;

said second image conducting means includes a second optical pathway and a second input port, said second optical pathway positioned between said second input port and said right eye viewing port.

* * * * *

UNITED STATES PATENT AND TRADEMARK OFFICE
CERTIFICATE OF CORRECTION

PATENT NO. : 4,561,723

DATED : December 31, 1985

INVENTOR(S) : Nobuo Hamano and Kazumi Matsumoto

It is certified that error appears in the above-identified patent and that said Letters Patent is hereby corrected as shown below:

Column 2, Line 49 "associated" should be --association--.

Column 10, line 17 the first occurrence of the word "same" should be --game--.

Column 11, line 16 the second occurrence of the word "to" sould be --of--.

Column 14, line 42 "transparent" should be --transparency--.

Signed and Sealed this

Twentieth Day of May 1986

[SEAL]

Attest:

DONALD J. QUIGG

Attesting Officer

Commissioner of Patents and Trademarks